No. 891,770.
PATENTED JUNE 23, 1908.
J. D. GARFIELD.
FOCAL PLANE SHUTTER.
APPLICATION FILED SEPT. 3, 1907.
3 SHEETS—SHEET 3.
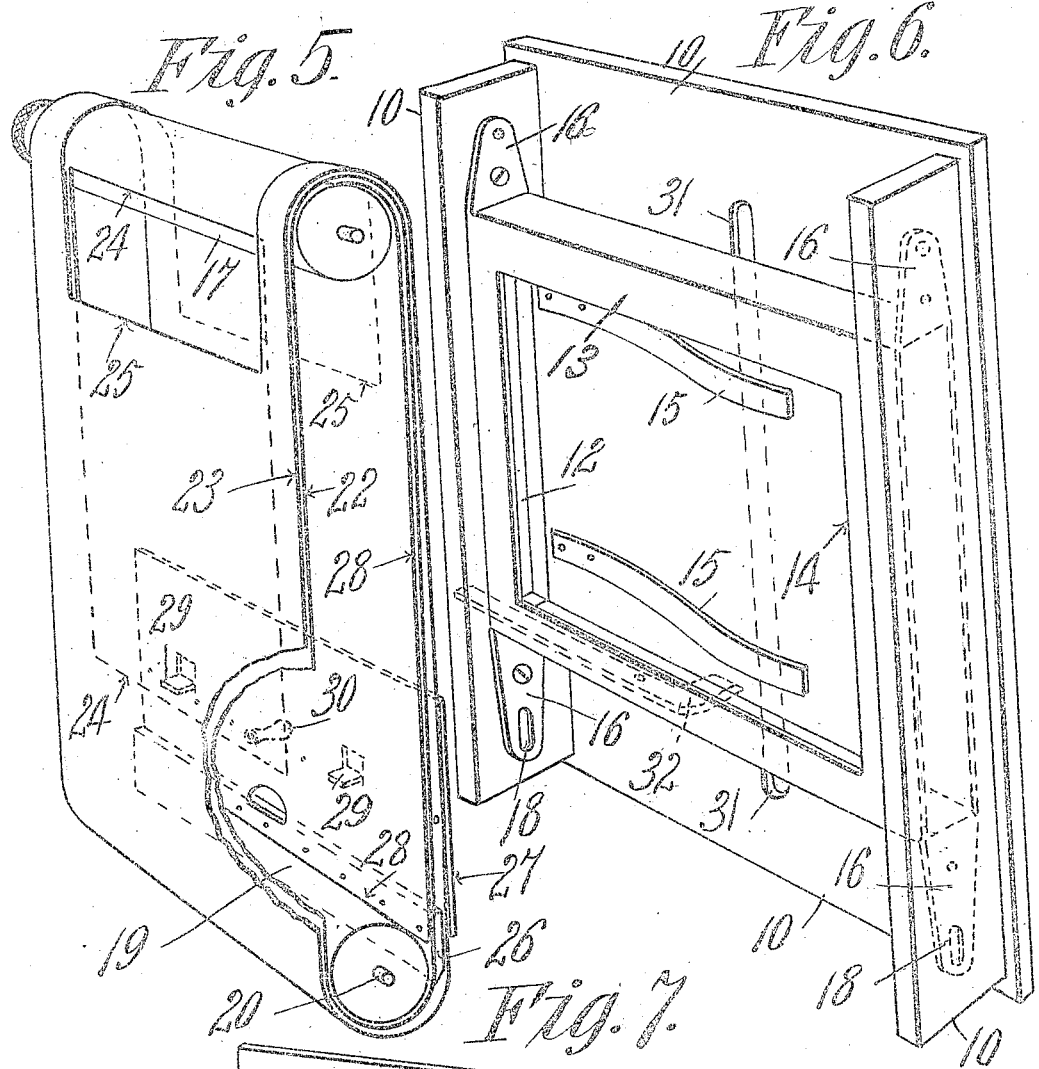
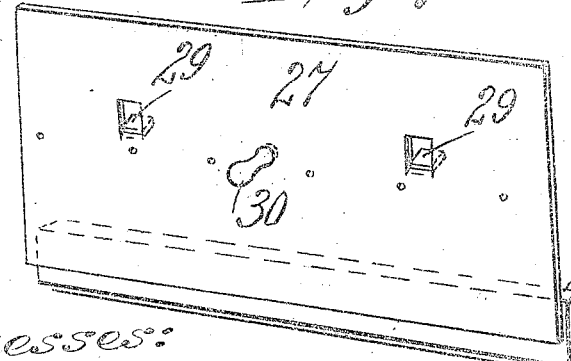

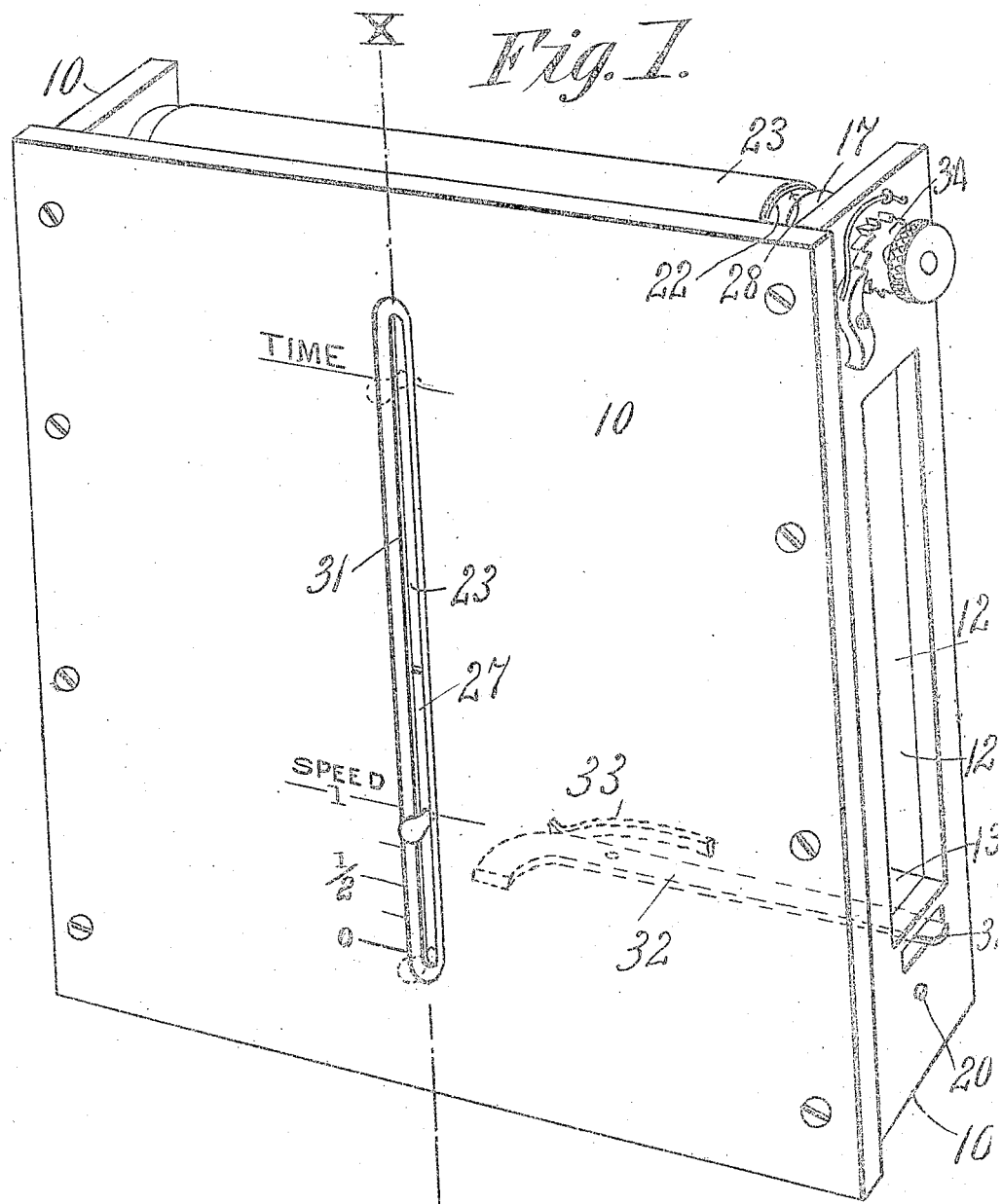

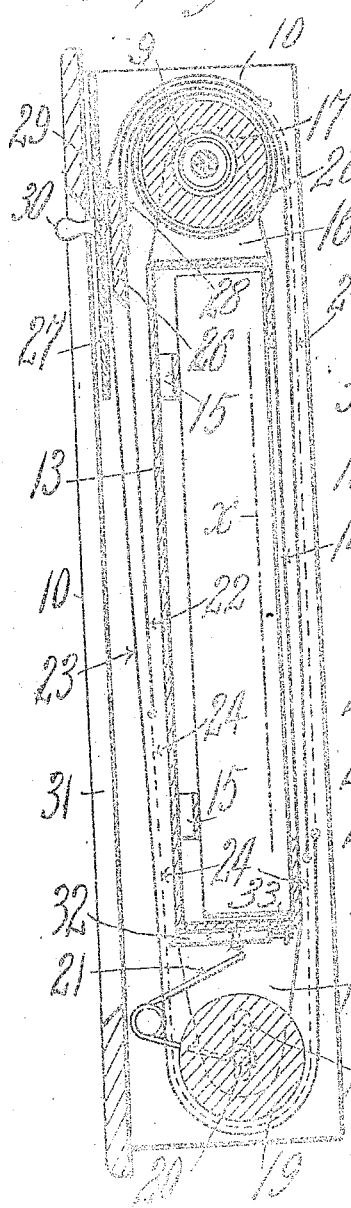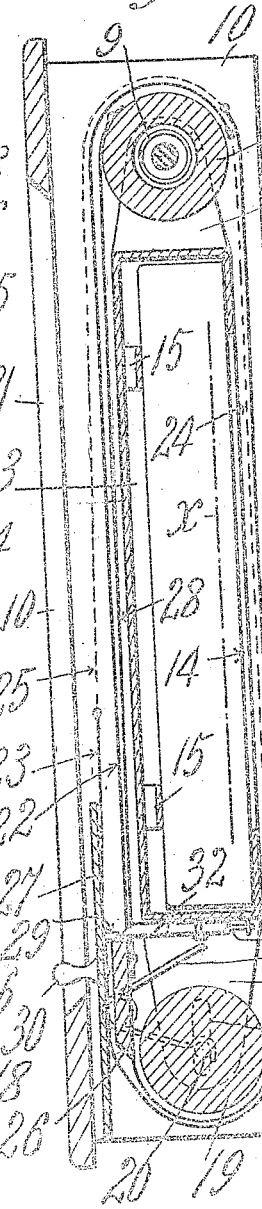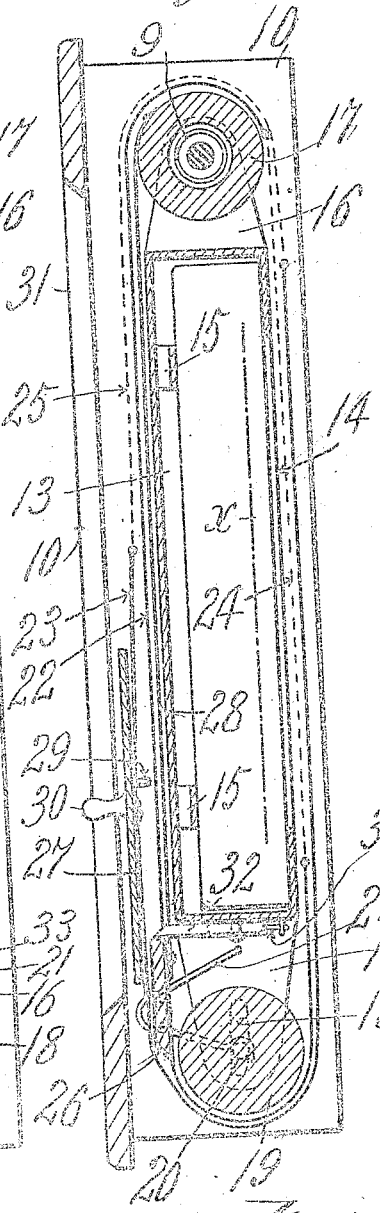

UNITED STATES PATENT OFFICE.

JULIUS D. GARFIELD, OF SPRINGFIELD, MASSACHUSETTS.

FOCAL-PLANE SHUTTER.

No. 891,770.  Specification of Letters Patent.  Patented June 23, 1908.

Application filed September 3, 1907. Serial No. 391,114.

*To all whom it may concern:*

Be it known that I, JULIUS D. GARFIELD, a citizen of the United States of America, and resident of Springfield, in the county of Hampden and State of Massachusetts, have invented certain new and useful Improvements in Focal-Plane Shutters, of which the following is a full, clear, and exact description.

This invention relates to focal plane shutters for photographic cameras, the object thereof being to construct a device of this class whereby the shutter may be quickly set by means outside of the camera-box for either an instantaneous or a time exposure, and whereby, by the same means, the extent of the opening of the exposing slit in the shutter may be quickly established; a further object being to provide means located in proximity to the shutter setting devices, whereby the extent of the opening of said shutter may be indicated: and the invention also consists in the construction of a shutter of this class which comprises two superposed curtains movable as one in one direction; and in various novel constructions and arrangements of parts all as fully described in the following specification, and clearly set forth in the claims.

In the drawings forming part of this specification,—Figure 1 is a perspective view of the rear portion or reversible back of a camera having my improved shutter applied thereto. Figs. 2, 3 and 4 are vertical sections of the shutter as taken on the line X—X, Fig. 1, different relations of the curtains comprised as important parts of the shutter being shown, for rendering the operative capabilities of the shutter entirely clear. Fig. 5 is a perspective view of the curtains and their supporting rollers shown as removed from the supporting structure therefor:—Fig. 6 being a perspective view of the supporting structure; and Fig. 7 is a perspective view of movable appliances with which the curtains are connected or engaged.

Similar characters of reference indicate corresponding parts in all of the views.

In the drawings, 10 indicates the rear portion of a camera-box, and, as indicated in Fig. 1, it may be a detachable part or section of the main camera-body. One side of this box section is provided with an opening 12 for the admission of a plate or film-pack holder. Located directly opposite this opening on the inside of said part 10 of the camera box is a rectangular case 13 made preferably of sheet metal. The front of this case is provided with a rectangular opening 14 of about the size and shape of the plate to be exposed. At the rear of this opening there are springs 15, of common construction, for pressing the plate-holder up to the proper position against the front of the case and adjacent the opening 14.

At each upper and lower corner, at both ends of the case, are bent-up ears 16 which have holes for screws or rivets by which the case is firmly attached to the camera box section 10. The ears 16, at the top of the case, are provided with holes or bearings for the support of a spring-roll 17 of well known construction, and the ears 16, at the bottom of the case, are provided with vertical slots 18 for the support of a second roll 19.

Between the journals 20 of the roll 19, and the bottom of the case 13 are interposed suitable springs 21.

Around the rolls 17 and 19, and arranged one over the other, are stretched, or in taut condition, two endless curtains 22 and 23 of rubber coated cloth or similar or otherwise suitable light-excluding and flexible fabric or material. Both of these curtains have openings represented by the numerals 24 and 25 respectively. Secured to the spring-roller 17 and adapted, by its one end to be wound thereon, is a third curtain-like flexible connection 28, the opposite end of which is attached to the rib or batten 26 on the curtain 22, as illustrated in the Figs. 2 to 5 of the drawings. Another rib, plate or batten 27 made of sheet metal is provided, the same having two inwardly bent ears or lugs 29 which project through the curtain 23, and are adapted to engage the top of the rib or batten 26 on the curtain 22. Centrally located on said rib 27 is an outwardly projecting knob 30 which, as shown in Figs. 1 to 4, is adapted to slide vertically in the slot 31 in the said rear section or back 10 of the camera-box. In Fig. 4 the relative positions of the above described curtains, openings, and ribs are shown as in readiness to make a speed or so-called instantaneous exposure,—the curtains being shown in full lines and the openings 24 and 25 in dot and in separated relations for the purposes of clearness. On the bottom side of the case 13 is shown a pivoted catch or detent 32 (Figs.

1, 2, 3, 4 and 6), the inner and curved end of which has a beveled point which, by means of the spring 23, is, when the curtains have been moved to their set position, caused to assume the position over the rib 26 on the curtain 22, shown in Figs. 3 and 4. The other extremity of the detent 32 projects through to the exterior of the camera box 10, as seen in Figs. 1 and 6, thus affording a convenient and efficient release for the shutter. The spring-roll 17 is provided with a ratchet and pawl device 34 of any suitable construction to vary the speed of travel of the shutter, such affording a means for putting a suitable tension on the curtain-roll-spring 9, which spring, and its tensioning means just referred to are the same as those very common in household curtain or shade rollers. These two endless curtains 22 and 23, arranged one over the other and adapted to be supported on the above described rolls 17 and 19, and with the openings 24 and 25 and the means for moving the curtains and their openings relative to each other, constitute the shutter proper and the subject of this invention. In such operation the battens 27 and 26 of the outer and inner curtains 23 and 22 move upwardly at the rear of the device, and when the knob 30 on the batten 27 reaches the upper end wall of the slot 31 the movement of the outer curtain with its batten will be arrested; but the winding up action of the spring roller will still be effective to further move the inner curtain,—and then independently of the outer curtain,—until the batten 26 thereof is brought to contact against the lugs 29 appurtenant to the outer curtain, whereupon the relative positions of the curtains will be such, as shown in Fig. 1, that the slit or exposure opening will be closed.

The operation, as apparent from Figs. 2, 3 and 4, is as follows:—The normal position of the knob 30, after an exposure has been made, is indicated in Fig. 2. A downward movement now of the knob 30, brings the rib 27 on the curtain 23 into engagement with the rib 26 on the curtain 22, and thus carries the rear portion of the two curtains downwardly as one; and, at the same time, by means of the curtain-like connection 28, the spring-roller 17 is positively rotated against the action of its spring. On reaching the limit of downward movement provided for, the detent 32 engages the top of the rib 26, and thus, as seen in Figs. 3 and 4, holds the curtain 22 in its set position.

An upward or return movement of the knob 30 now causes the curtain 23 to slide over the curtain 22, the latter remaining stationary, and thereby changing the relative positions of the openings 24 and 25, a slit or opening is formed identical in vertical extent with the distance of the said return movement of the knob,—an illustration of which will be perceived on reference to Fig. 4. The degree of opening may be accurately measured and discerned by the scale, as apparent from Fig. 1.

The curtains forming the shutter being now set and held in position against the action of the spring-roller by the detent 32, and the exposing slit being in position at the upper portion of the front of the shutter, above the sensitive plate, as shown in Fig. 4, a release of the detent 32 now allows the two curtains to travel as one around the two rollers 17 and 19, and in so doing causes the exposing slit to move more or less rapidly downward and across the sensitive photographic plate and thus to make the exposure.

I claim:—

1. In a focal plane shutter for cameras, the combination of two endless and superposed curtains, adapted to receive and encircle, between the front and rear courses thereof, a photographic plate and having openings therein, the opening in one curtain being normally covered by a part of the other curtain, supports for the curtains, and means for moving one of the latter in one direction relative to the other to bring more or less of the area of one of said exposure openings opposite the other to form an exposure slit, and means for moving both of said curtains simultaneously in a direction to effect the passage of the exposure slit across said plate.

2. In a focal plane shutter for cameras, the combination of two superposed curtains adapted to encircle a photographic plate and having openings therein, the opening in one curtain being normally covered by a part of the other curtain, supporting rolls for the curtains, one of said rolls being power-actuated in one direction, a detent for one of the curtains, and means for moving the other in one direction to bring some part of one of said openings opposite the other opening to form an exposure slit, and means for operating said detent whereby said power-actuated roll may move both of the curtains simultaneously to effect the passage of said exposing slit across said plate.

3. In a focal plane shutter for cameras, the combination of two endless and superposed curtains, adapted to receive and encircle, between the front and rear courses thereof, a photographic plate and having openings therein, rolls for supporting the curtains, said curtains having exposure openings therein, one normally out of registration with the other, a detent for holding one of said curtains temporarily stationary, and means for moving the other of said curtains independently in one direction to bring said openings more or less nearly into registering position to form an exposure slit, means for applying endwise tension to said curtains, and means for moving both of said curtains simultaneously in a direction the reverse of that in which the one of said curtains shall have been moved, for causing a traversing of the exposure slit across the face of the plate.

4. The combination, in a focal plane shutter for cameras, of a casing, shutter devices consisting of two superposed endless curtains having normally non-registering openings therein, adapted to encircle a photographic plate, rolls for supporting said curtains in said casing, a batten secured to each of the curtains for inter-engagement one with the other, whereby said curtains may be moved together in one direction, a knob attached to one of said curtains and means for holding the other temporarily stationary, whereby one of the curtains may be moved relative to the other to bring said openings more or less into registering position, a slot through said casing for said knob, and an indicator-scale in proximity to said knob.

5. In a focal plane shutter the combination with a spring roller, and another roller parallel therewith and separated therefrom, of a curtain having an engagement with the spring roller, to be propelled thereby, and passing over the other roller, a second curtain made endless, superposed about the inner curtain, having a frictional surface contact therewith, adapted to encircle a plate-holder between its front and rear courses, and each of said curtains having an exposure aperture therein, means for adjusting the one curtain relatively to the other to bring their apertured portions in desired relations, and a detent operative to hold the frictionally engaged curtains against their roller propelled movements, and to release them for their movements in unison.

Signed by me at Springfield, Mass., in presence of two subscribing witnesses.

JULIUS D. GARFIELD.

Witnesses:
WM S. BELLOWS,
G. R. DRISCOLL.